United States Patent
Yamada et al.

(10) Patent No.: US 6,491,436 B1
(45) Date of Patent: Dec. 10, 2002

(54) PLAIN BEARING

(75) Inventors: Tatsuo Yamada, Nagoya (JP); Toshiaki Kawachi, Nagoya (JP); Hideo Ishikawa, Nagoya (JP); Takayuki Shibayama, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 1 day.

(21) Appl. No.: 09/677,847

(22) Filed: Oct. 3, 2000

(30) Foreign Application Priority Data

Oct. 12, 1999 (JP) .......................................... 11-289110

(51) Int. Cl.⁷ ............................................. F16C 33/12
(52) U.S. Cl. ........................ 384/283; 384/291; 384/322
(58) Field of Search ................................ 384/276, 282, 384/283, 291, 292, 322

(56) References Cited

U.S. PATENT DOCUMENTS

| | | | |
|---|---|---|---|
| 627,985 A | * 7/1899 | Delano ........................ | 384/292 |
| 4,491,373 A | 1/1985 | Sugi et al. | |
| 4,561,787 A | 12/1985 | Ehrentraut et al. | |
| 5,238,311 A | * 8/1993 | Katou et al. ................. | 384/292 |
| 5,271,677 A | 12/1993 | Sherman et al. | |
| 5,320,431 A | * 6/1994 | Kallenberger ............... | 384/322 |
| 5,415,476 A | * 5/1995 | Onishi ......................... | 384/292 |
| 5,817,397 A | * 10/1998 | Kamiya et al. ............. | 384/283 |
| 5,908,247 A | 6/1999 | Leuthold et al. | |
| 6,059,460 A | * 5/2000 | Ono et al. .................. | 384/322 |

FOREIGN PATENT DOCUMENTS

| | | |
|---|---|---|
| DE | 36 21577 A1 | 2/1987 |
| EP | 0 758 721 A1 | 2/1997 |
| JP | 2-38714 | * 2/1990 |
| JP | 7-259863 | * 10/1995 |

* cited by examiner

Primary Examiner—William C Joyce
(74) Attorney, Agent, or Firm—Browdy and Neimark

(57) ABSTRACT

In order to enhance the fatigue resistance and the anti-seizure property while maintaining the. embeddability, there is provided a plain bearing comprising a bearing alloy layer, an intermediate layer and an overlay layer which are formed on the inner surface of a back metal in this order. The inner surface of the bearing alloy layer is provided with a recess groove "a" extending in the circumferential direction, so that the inner surface is made into a textured uneven condition. The recess groove "a" has a bent portion which is bent relative to the circumferential direction, so that a foreign substance X entering between a mating shaft and the plain bearing is moved in the circumferential direction owing to the rotation of the shaft, the foreign substance X runs against a side edge of the recess groove "a" and moves along the side edge, thereby the embedding of the foreign substance into the overlay layer is promoted. If the foreign substance fails to be adequately embedded, the foreign substance leaves the side edge again at the bent portion.

2 Claims, 5 Drawing Sheets

BACK METAL

CIRCUMFERENTIAL DIRECTION

PLAIN BEARING

BACKGROUND OF THE INVENTION

1. Field of the Invention

This invention relates to a plain bearing, and more particularly to a plain bearing having a bearing alloy layer of which the inner surface is in a textured uneven surface and coated with an overlay layer.

2. Description of the Related Art

There is known a plain bearing of the type in which a bearing alloy layer is bonded to a back metal and an overlay layer made from a soft material such as a Pb-Sn alloy is provided on the inner surface of the bearing alloy layer so as to enhance the conformability and the embeddability for a foreign substance. There is also known a plain bearing of the type in which an intermediate layer made of Ni or the like is provided between the bearing alloy layer and the overlay layer so as to prevent components contained in the overlay layer from diffusing into the bearing alloy layer and improve adhesiveness of the overlay layer.

In those types of bearing, when the overlay layer wears to the extent that the hard intermediate layer extends widely, a mating shaft would directly slide on the hard intermediate layer and thus the seizure would be liable to occur abruptly. Therefore, there is also known a plain bearing of the type in which a plurality of recess grooves 64 are formed in the circumferential direction on the inner surface of the bearing alloy layer 61 by boring, and an intermediate layer 62 and an overlay layer 63 are further provided on the recess grooves 64, as shown in FIGS. 9 and 10, so that even when the overlay layer 63 wears, the intermediate layer 62 and/or the bearing alloy layer 61 does not extend widely but intermingles with the soft overlay layer 63 in the recess grooves 64 so as to maintain the anti-seizure property.

SUMMARY OF THE INVENTION

However, since the recess grooves 64 formed by boring extend in parallel with each other in the circumferential direction, when a foreign substance X such as a chip or a deterioration product of lubricant is introduced between the shaft and the plain bearing during the operation, the foreign substance is frictionally moved in the circumferential direction while leaving a long scar (or damage) on the surface of the overlay layer. As a result, the anti-seizure property of the bearing is reduced, and the damage may cause the spread of a fatigue crack. Therefore, it has been impossible to provide a plain bearing excellent both in the anti-seizure property and the fatigue resistance.

Accordingly, it is an object of the invention to provide a plain bearing excellent both in the anti-seizure property and the fatigue resistance.

According to a first aspect of the invention, there is provided a plain bearing of the type in which a recess groove formed on the inner surface of a bearing alloy layer has a bent portion so that when a foreign substance introduced between a mating shaft and the plain bearing is moved in the circumferential direction in accordance with the rotation of the shaft, the foreign substance runs against a side edge of the recess groove and moves along the side edge, and thereafter leaves the side edge again.

According to this aspect of the invention, when a foreign substance enters between the shaft and the plain bearing, it is moved in the circumferential direction while being embedded in the soft overlay layer by the pressing force of the shaft. After that, the foreign substance runs against a side edge of the recess groove and moves along the side edge while being pressed against the side edge. The pressing force promotes the embedding of the foreign substance into the overlay layer. Moreover, since the foreign substance which is failed to be adequately embedded into the overlay layer leaves the side edge at the bent portion and moves in the circumferential direction until it runs against the next side edge, the foreign substance does not bite on a side edge of the recess groove.

According to a second aspect of the invention, the recess groove is formed into a ring configuration corresponding to the inner surface of the bearing alloy layer. According to a third aspect of the invention, the recess groove is formed into a spiral configuration with respect to the circumferential direction on the inner surface of the bearing alloy layer.

The bearing alloy may be made of a Cu alloy or an Al alloy, for representative examples. The overlay layer may be made of one selected from the group of Pb, a Pb alloy, Sn, a Sn alloy, and a known sliding resin such as PTFE and PFA, for example.

Moreover, the bearing alloy layer may be directly covered with the overlay layer. Alternatively, the intermediate layer such as Ni or Ag may be provided between the bearing alloy layer and the overlay layer so as to enhance the adhesiveness and prevent components contained in the overlay layer from diffusing into the bearing alloy layer, as claimed in claim 2. The intermediate layer may be made of one selected from the group of Ni, Ag, a Ni alloy, Cu, a Cu alloy, Co, a Co alloy, Sn, a Sn alloy, an Ag alloy, Zn and a Zn alloy, for example.

The overlay layer may be made of a lead-tin alloy, for a representative example. However, the overlay layer may be made from other soft material such as a resin and a tin base alloy.

In the first aspect of the invention, a recess groove is formed in a bent shape so that when a foreign substance introduced between sliding surfaces of a shaft and a plain bearing is moved in the circumferential direction in accordance with the rotation of the shaft, it runs against a side edge of the recess groove and moves along the side edge, and thereafter leaves the side edge again. Further, the inner surface of the bearing alloy layer is made into a textured uneven condition owing to the recess groove formed thereon in the circumferential direction, and the overlay layer is provided on the inner surface of the bearing alloy layer to fill the recess groove, whereby there is provided a plain bearing excellent in the anti-seizure property and the embeddability for a foreign substance.

DESCRIPTION OF THE PREFERRED EMBODIMENTS

Figure 1:
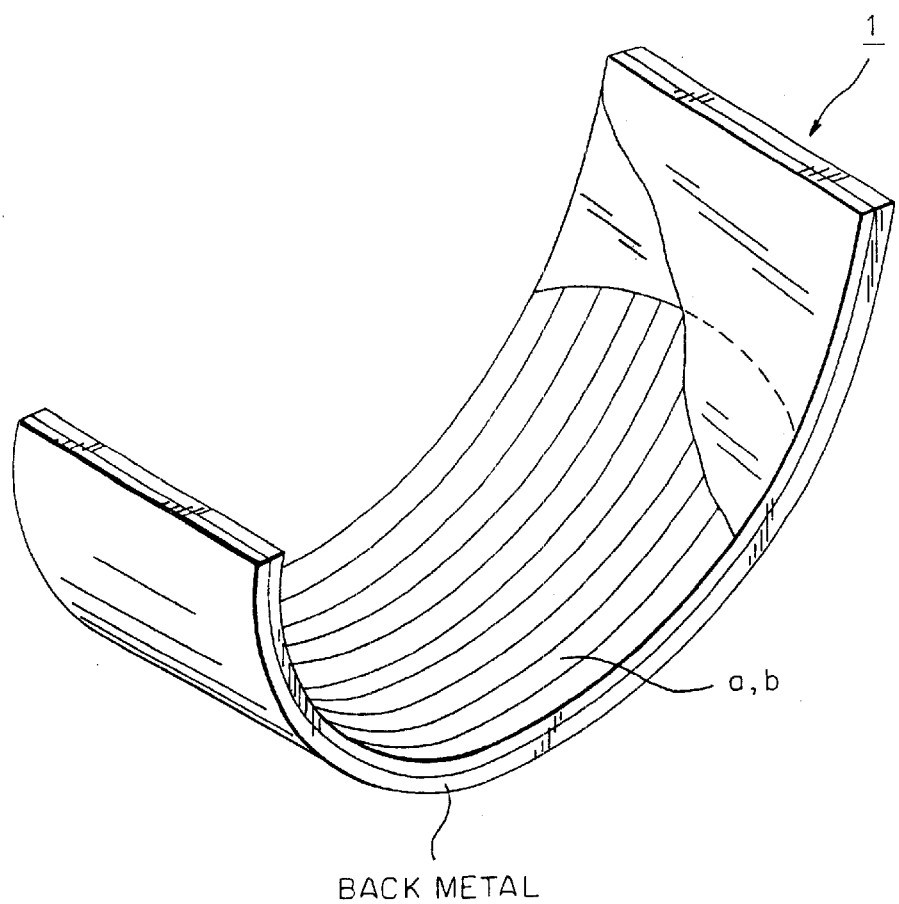
FIG. 1 is a partly-broken perspective view of a plain bearing of the invention.

A preferred embodiment of the present invention will now be described in detail with reference to FIGS. 1 to 5. In this embodiment, the minimum oil film thickness (Hmin.) portion formed on the inner surface of a plain bearing half 1 in connection with a mating shaft appears in the center of the inner surface in the circumferential direction (namely, in the lateral direction of FIG. 2). Therefore, the inner surface of the plain bearing half 1 is made into a textured uneven surface (described below) within the angle range of 70° from the circumferential center line L (around the axis of the bearing) toward the respective circumferential end of the bearing so as to cover the portion in which the minimum oil film thickness appears.

A method of producing this plain bearing half 1 will be described. In the method, a bimetal plate, which is formed by bonding a bearing alloy layer 2 of a copper alloy to a back metal (not shown), is cut into a predetermined size, and the bimetal plate is bent into a half-cylindrical shape by machining (press forming), and thereafter ends of the curved piece are processed, so that the plain bearing half 1 of a half-cylindrical shape having an outer diameter of 56 mm and a width of 26 mm is provided.

Next, the obtained plain bearing half 1 is subjected to degreasing by water cleaning, electrolytic degreasing, and pickling, as pretreatment. Then, areas not to be etched are masked. In this embodiment, the masking is effected by pad printing using the masking material HER300 (Trademark) produced by OKUMURA SEIYAKU KOGYO K. K. in Japan.

As is well known, pad printing can provide various shapes of pattern, while this embodiment adopts the pattern described below. A masking material for this pad printing is HER300 (Trademark) which is excellent in the acid-resistance and the alkali-resistance. The masking material HER300 (Trademark) is applied on the inner surface of the plain bearing except for areas to be etched, the outer surface and the edge surfaces for coating those. After coating the whole plain bearing half 1 except for the etched areas, etching is carried out. More specifically, the plain bearing half 1 is immersed in an etching solution which contains nitric acid of 20 ml/l, hydrochloric acid of 20 ml/l and hydrogen peroxide of 20 ml/l and then, electrolytic etching is effected at a current density of $2A/dm^2$ at 20° C. for 10 minutes. As a result, the areas which are not covered with the masking material are etched to form recess grooves "a" having a generally channel-shaped cross section and a depth of 20 $\mu$m (see FIG. 4). On the contrary, the areas covered with the masking material are not etched and hence remain intact to form elongate protrusions "b", so that the inner surface of the bearing alloy layer 2 turns into a textured uneven condition. The etching depth can be adjusted by changing the electrolytic etching condition appropriately. After the electrolytic etching, the plain bearing is rinsed by water so as to remove the masking material.

Figure 2:
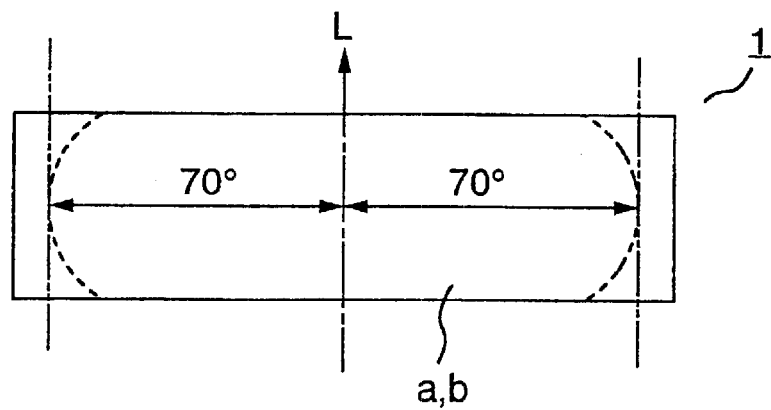
FIG. 2 is a developed view of the plain bearing.

Then, after electrolytic pickling, an intermediate layer 3 having a thickness of 1.5 $\mu$m is formed by Ni plating. As a result, the intermediate layer 3 is formed so as to cover the textured uneven surface. Namely, the intermediate layer 3 is provided in conformity with the contour of the textured uneven surface. Then, an overlay layer 4 having a thickness of 20 $\mu$m is formed on the intermediate layer 3 by lead-tin alloy plating. The obtained plain bearing half 1 is subjected to finishing machining, so that the plain bearing half 1 shown in FIGS. 1 and 2 is completed.

The inner surface of the bearing alloy layer 2 (see FIG. 4) made of a copper alloy is covered with the intermediate layer 3 made of Ni having a thickness of 1.5 $\mu$m, and the intermediate layer 3 is covered with the overlay layer 4 made of a lead-tin alloy having a thickness of 20 $\mu$m.

Figure 3:
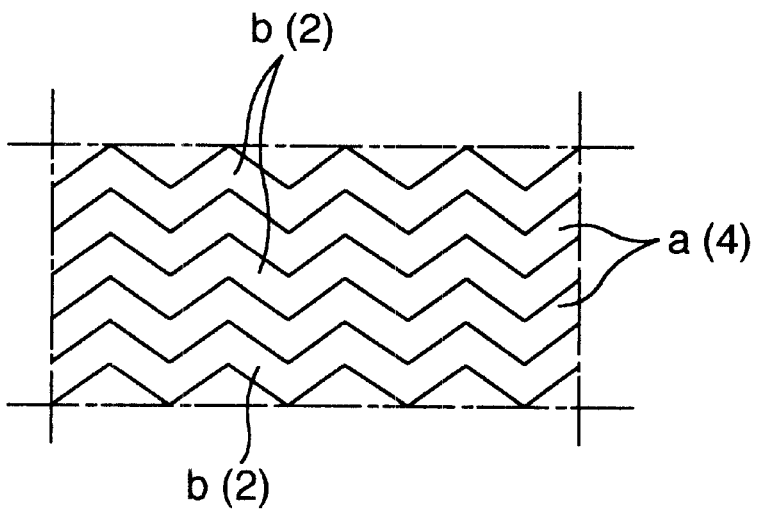
FIG. 3 is an enlarged plan view of a portion of the plain bearing for showing the configuration of recess grooves.
Figure 4:
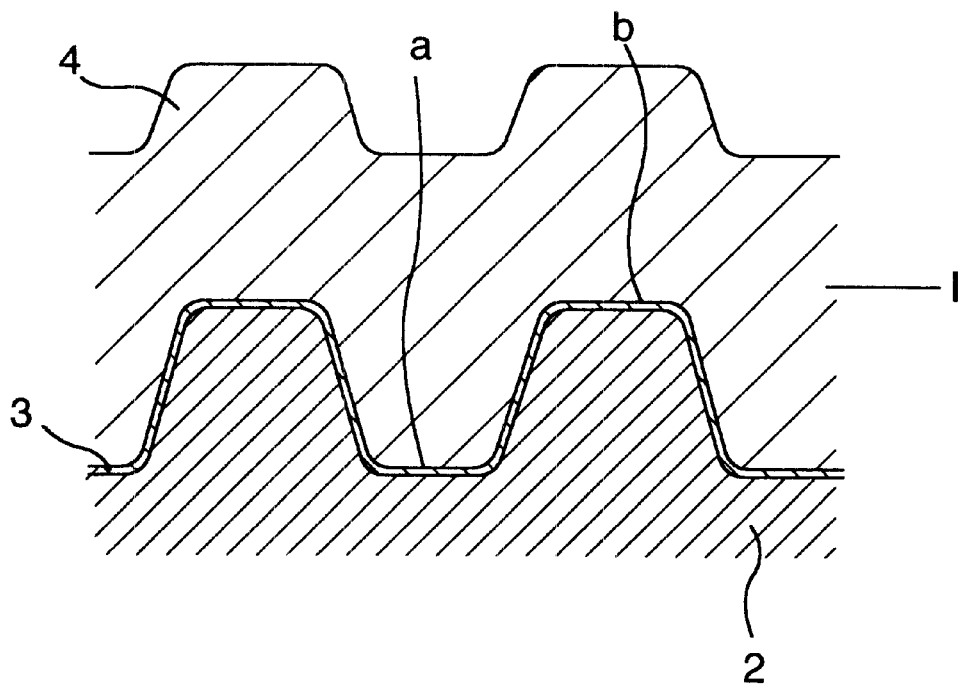
FIG. 4 is an enlarged cross-sectional view of a portion of the plain bearing.

In this embodiment, as shown in an enlarged scale in FIG. 3, the recess grooves "a" are formed in a continuous zigzag shape which extends in a band-like with a width of 100 $\mu$m (namely, a continuous mountain-like shape consisting a series of isosceles triangles with a pitch of 10 mm, each of which triangles has two interior angles of 30° relating to the circumferential direction). Any two adjacent recess grooves "a" are spaced from each other by the zigzag protrusions "b" having a width of 50 $\mu$m. Thus, the recess grooves "a" and the protrusions "b" are alternately arranged in the axial direction.

Figure 5:
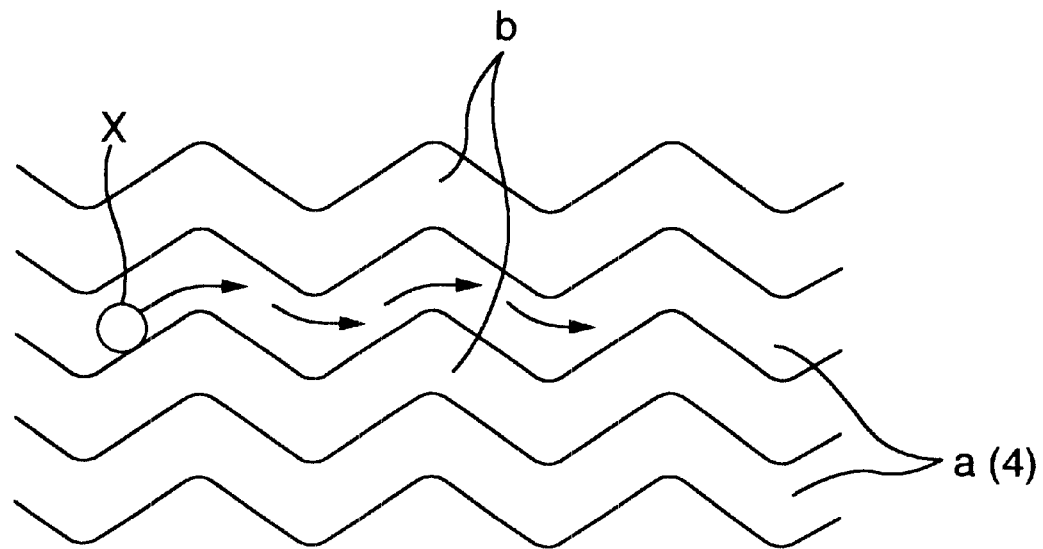
FIG. 5 is an enlarged plan view of a portion of the plain bearing for explaining a movement of a foreign substance.

This plain bearing 1 is mounted on a housing (not shown), and when an associated machine is operated, the overlay layer 4 is worn with the lapse of time. When the overlay layer 4 is worn to a level I (shown in FIG. 4), the bearing alloy layer 2 becomes exposed. At this time, since a shaft slides on the bearing alloy layer 2 at the portion of the protrusions "b" and the soft overlay layer 4 at the portion of the recess grooves "a", the bearing alloy layer 2 and/or the hard intermediate layer 3 will not be exposed widely, so that the seizure is prevented. In this situation, when a foreign substance X shown in FIG. 5 is introduced between the plain bearing and the shaft, the foreign substance X is moved in the circumferential direction in the overlay layer 4 in accordance with the rotation of the shaft, and runs against a side edge of the protrusions "b". Since the side edge is slanting at an angle of 30° relative to the circumferential direction, the foreign substance X moves along the side edge while being embedded in the overlay layer 4. After that, when the foreign substance X moves over the apex of a triangle formed by the side edge, the foreign substance X leaves there and moves in the circumferential direction through the overlay layer 4 again, and thereafter hits against the next side edge of the protrusions "b". When the foreign substance X moves along the side edge of the protrusions "b", the foreign substance X is more liable to be embedded in the overlay layer 4 as compared with the case where the foreign substance X moves through the overlay layer 4 in the circumferential direction, and therefore the foreign substance X is soon embedded in the overlay layer 4 and made in harmless, so that it is possible to prevent the overlay layer 4 from being much damaged. Moreover, the reason that the triangles of the recess grooves "a" are arranged at a pitch of 10 mm is that if the side edge is too much longer, the foreign substance X is kept pressed with the protrusions for a long time, so that the seizure is liable to occur.

And besides, even if a fatigue crack develops in the overlay layer 4, the fatigue crack reaches the protrusions "b" soon, so that the further spreading is prevented and the cracking is limited within a small region.

Although one preferred embodiment of the invention has been described above in detail, the invention is not limited to the embodiment, but various modifications as described below for example can be made without departing from the scope of the invention.

Figure 6:
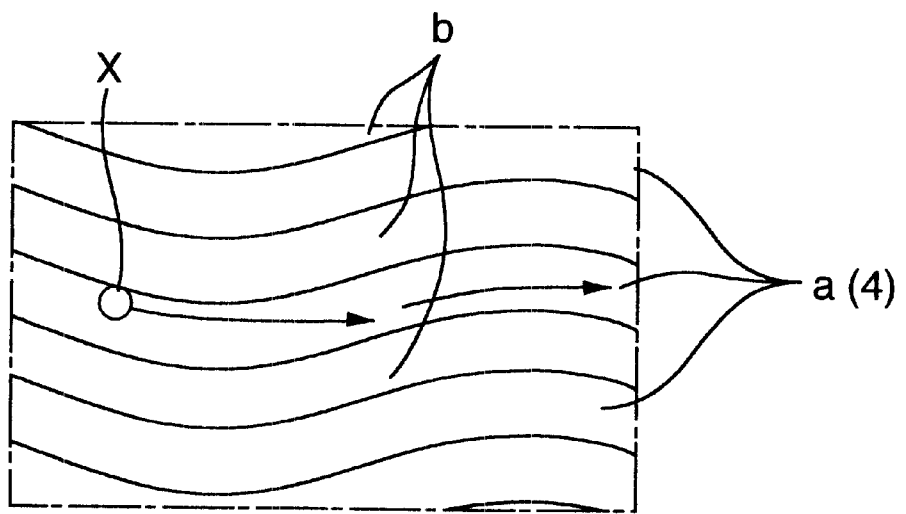
FIG. 6 is an enlarged plan view of a portion of a plain bearing according to further embodiment.
Figure 7:
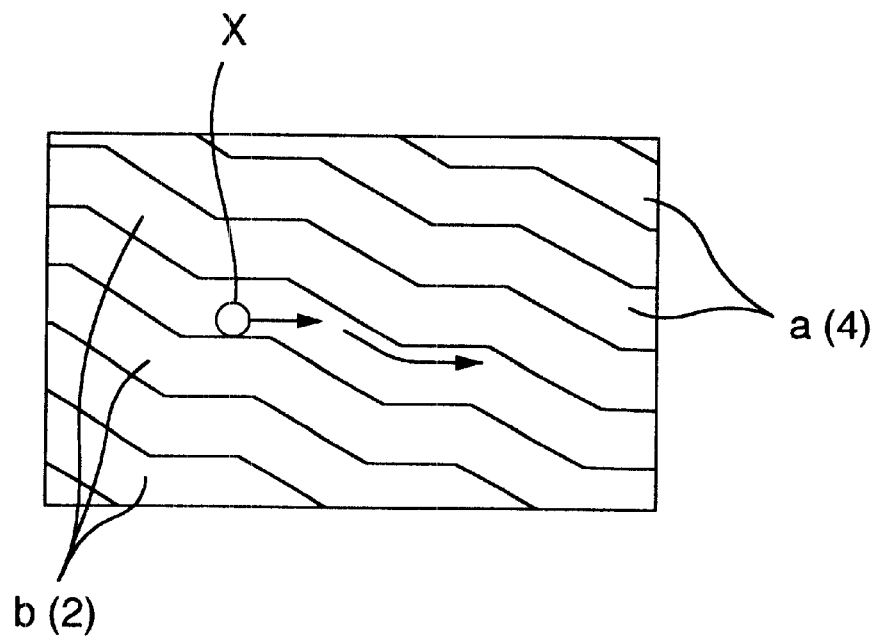
FIG. 7 is an enlarged plan view of a portion of a plain bearing according to still further embodiment.
Figure 8:
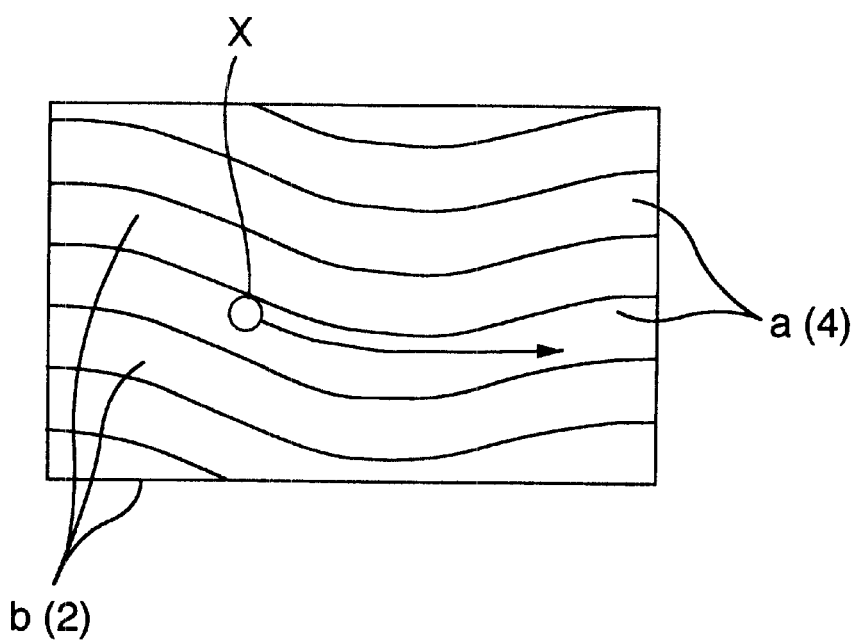
FIG. 8 is an enlarged plan view of a portion of a plain bearing according to yet still further embodiment.
Figure 9:
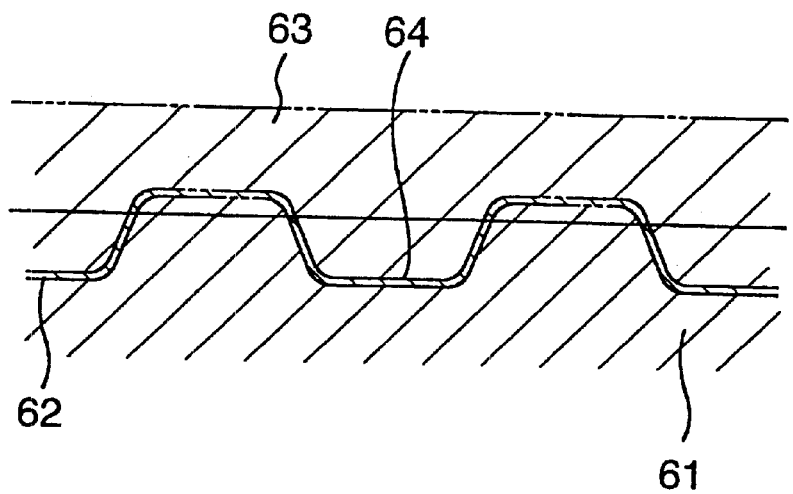
FIG. 9 is an enlarged cross-sectional view of a portion of a conventional plain bearing.
Figure 10:
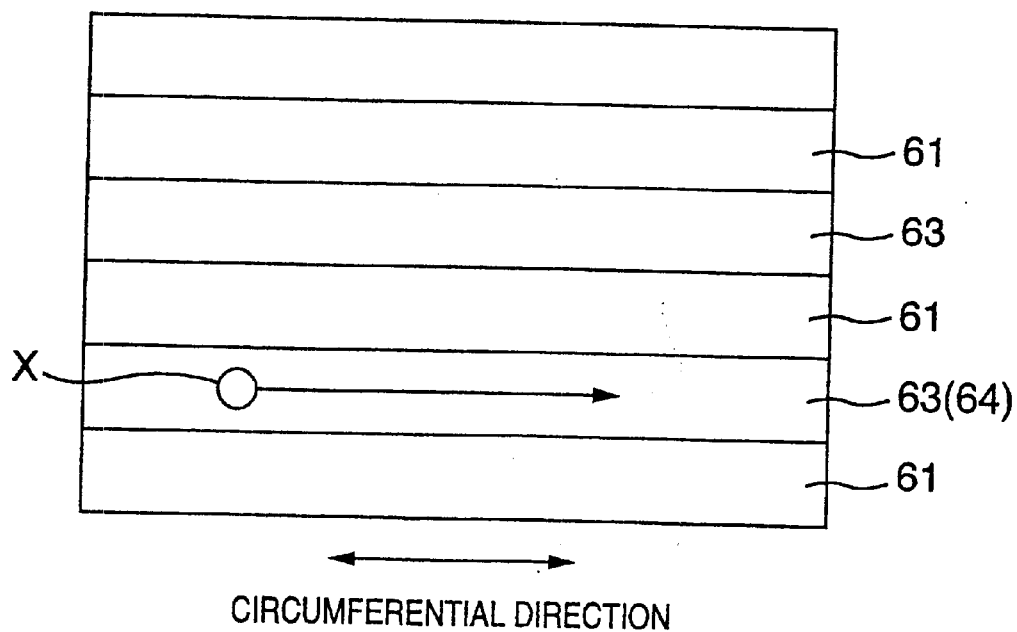
FIG. 10 is an enlarged plan view of the conventional plain bearing.

(1) In the above embodiment, although each of the recess grooves "a" extends in a zigzag shape defined by the series of triangles arranged at a pitch of 10 mm in the circumferential direction, the recess grooves a may be formed into a gently-curved zigzag shape as shown in FIG. 6. Namely, in the present invention, the recess grooves may be configured so that a foreign substance X moves while contacting with a side edge of an protrusion "b", and thereafter leaves there and moves to the next side edge of the protrusions "b". The example of FIG. 3 can be modified into an example of FIG. 7 in which the recess grooves "a" extend obliquely relative to the circumferential direction. Moreover, the example of FIG. 6 can be modified into an example of FIG. 8 in which the recess grooves "a" extend obliquely relative to the circumferential direction.

(2) In the above embodiment, although the sliding surface is covered with the overlay layer 4 made of a lead-tin alloy, for example, the inner surface of the bearing may be finished so as to expose the bearing alloy layer 2 and the overlay layer 4 in a stripe manner.

(3) In the above embodiment, although the depth of etching in connection with the bearing alloy layer 2 is 20 $\mu$m for example, the etching depth may be modified within the range of from 5 to 50 $\mu$m by changing the etching condition.

What is claimed is:

1. A plain bearing of a cylindrical or half-cylindrical shape, comprising:

a back metal;

a bearing alloy layer provided on the inner surface of the back metal, the bearing alloy layer having a recess groove formed on the inner surface thereof, the recess groove extending generally in the circumference direction of the plain bearing; and an overlay layer provided on the inner surface of the bearing alloy layer so as to fill the recess groove and an intermediate layer provided between the bearing alloy layer, the intermediate layer being made of Ni or Ag; wherein the recess groove has a plurality of bent portions whereby said recess groove extends zigzag on the inner surface of the bearing alloy layer, so that when a foreign particle comes between a mating shaft and the plain bearing, the foreign particle runs against a side edge of the recess groove and moves along the side edge, and thereafter leaves the side edge again in accordance with the rotation of the shaft, so as to become embedded in the overlay layer.

2. A plain bearing according to claim 1, wherein the zigzag recess groove extends in an oblique direction with respect to the circumferential direction.

* * * * *